A. L. ROCK.
POTTERY ORNAMENTATION.
APPLICATION FILED AUG. 19, 1908.

912,171.

Patented Feb. 9, 1909.

WITNESSES
E. G. Bromley
Rev. G. Wooster

INVENTOR
Alban L. Rock
BY Munn & Co.
ATTORNEYS

UNITED STATES PATENT OFFICE.

ALBAN L. ROCK, OF YOKOHAMA, JAPAN, ASSIGNOR TO A. A. VANTINE & CO., OF NEW YORK, N. Y., A CORPORATION OF NEW JERSEY.

POTTERY ORNAMENTATION.

No. 912,171.          Specification of Letters Patent.          Patented Feb. 9, 1909.

Application filed August 19, 1908. Serial No. 449,223.

*To all whom it may concern:*

Be it known that I, ALBAN L. ROCK, a citizen of the United States, at present residing in Yokohama, Japan, have invented a new and Improved Pottery Ornamentation, of which the following is a full, clear, and exact description.

The object of the invention is to provide a new and improved pottery ornamentation, the ornamentation being arranged to produce a permanent glass bead effect on porcelain vases and other pottery articles, in such a manner that the colorless transparent glass beads are fused in position on the body of the pottery article by a fusing pigment which produces color effect in any predetermined design.

The invention consists of novel features and parts and combinations of the same, which will be more fully described hereinafter and then pointed out in the claim.

A practical embodiment of the invention is represented in the accompanying drawings, forming a part of this specification, in which similar characters of reference indicate corresponding parts in all the views.

Figure 1:
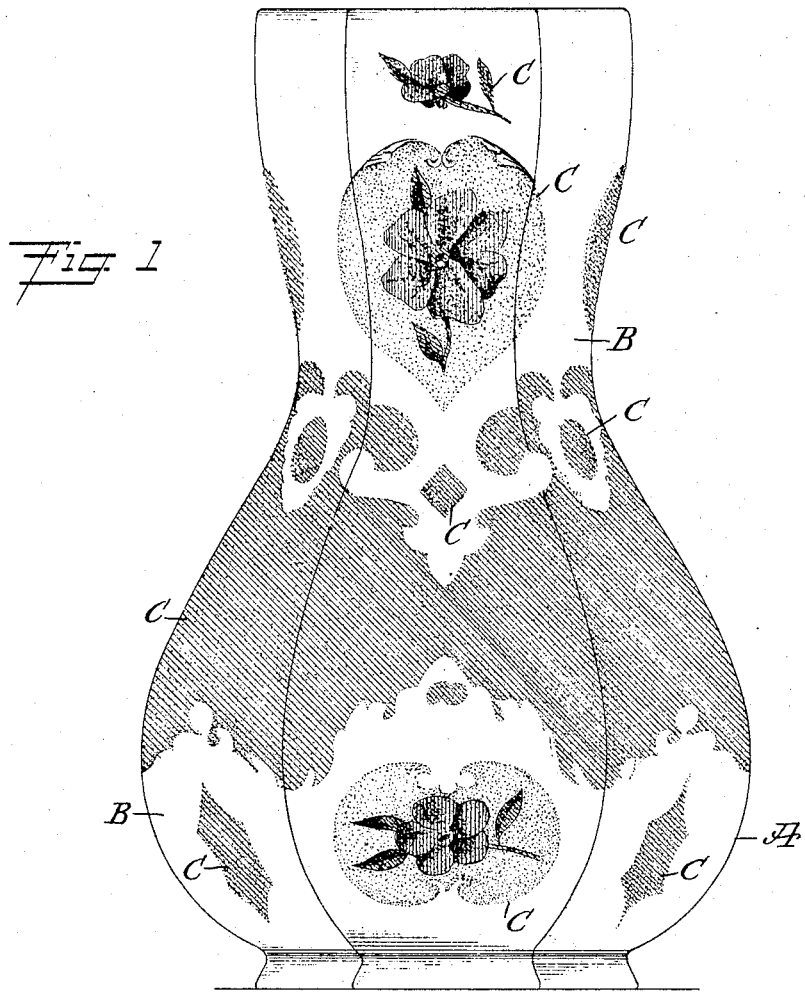
Figure 2:
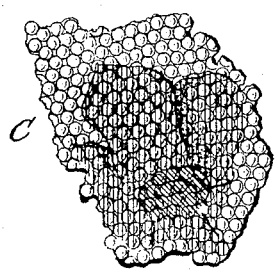
Figure 3:
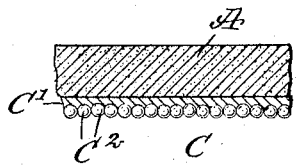

Figure 1 is a side elevation of a vase showing the improvement and produced according to my method; Fig. 2 is an enlarged side elevation of part of the same; and Fig. 3 is a transverse section of the same.

A portion of the surface of the body A of the vase shown in Fig. 1, is ornamented by a suitable gold ornamentation B, and the remaining surface portion is covered by a glass bead ornamentation C, which consists of a fusing and carrying medium $C'$ and colorless transparent glass beads $C^2$ fused to the surface of the body A by the said fusing and carrying medium $C'$. The beads $C^2$ are comparatively small and are preferably spherical in shape, and the fusing and carrying medium $C'$ may be in a plain uniform color or in many colors, according to a predetermined design, as indicated at the portions representing the flowers on the vase shown in Fig. 1. The fusing and carrying medium $C'$ consists of porcelain pigments and a fusible matter, either mixed together prior to the application on the body, or applying the said pigments first and then the fusible matter. Sometimes both methods are used on the same article. As a rule, color work on porcelain showing bead decorations, is done in a dull color effect by means of mixing shiroye, balsam copaiba with oil of turpentine, and then the outline of the bead design is done by a specially prepared pigment which when fired results in the gold-moriage.

The principal components of the fusible matter are 248 grains of silicate of albumen (shiroye) and 192 grains of flux (hakukyoku) to which is added as a carrying medium about 9.6 grains of a dry porcelain pigment or color, the several ingredients being mixed with a certain percentage of water and all parts are well ground together. The porcelain color or pigment used with the fusible matter to form the fusible and carrying medium $C'$ must be of such a shade as can be fired satisfactorily at a uniform degree of heat, as otherwise some of the colors will not be fired enough while other shades may be fired too much, and the slightest mistake in the selection of color shades in this respect tends to spoil the article.

In practice, the fusing and carrying medium $C'$ is applied to the body of the vase in a wet state, and then the colorless transparent glass beads $C^2$ are placed onto the said wet fusing and carrying medium, which holds the beads in position one alongside the other, as the rear portions of the beads are pressed into the wet medium. The vase or other article thus decorated is then fired in the usual manner, so that the beads are fused with their rear portions onto the porcelain body by the fusing and carrying medium, to permanently fix the beads in place without destroying their brilliant effect, enhanced by the underlying color pigment arranged accordingly to a predetermined design representing flowers and other objects.

It is understood that the colors of the fusing and carrying medium are refracted through the glass beads, thus giving the vase a very fine appearance in a plush effect.

It is understood that the selection of the fusible and carrying medium and the degree of heat used in firing is of importance as the fusible matter must necessarily fuse at a lower degree than the glass beads $C^2$, so that only the rear portions of the glass beads which are in contact with the fusible matter melt and fuse with the fusible matter, fused and adhering to the body A of the vase or like article.

It is important in the use of the glass bead covering for the predetermined pattern for the different particles to lie closely together and to be distributed thus uniformly in close contact with each other throughout the area of the pattern produced upon the vase or other article and this is accomplished by the form of beads and the fusing of said beads upon the pattern as distinguished from the production of a granulated surface which might vary both as to size and proximity of its particles. The glass granulated material is produced directly upon a pane of glass or the like. By the beaded construction it will be noticed that the surface ornamentation of the vase or other article will be approximately smooth and simulate a plain surface as to touch without affecting the beauty of appearance gained by the spherical form of the beads as shown.

Having thus described my invention, I claim as new and desire to secure by Letters Patent:

A vase or like pottery article having a body, a fusing and carrying medium disposed on said body and colored and shaped to conform to a predetermined design, and comparatively small colorless spherical transparent beads arranged in contact with each other and covering the carrying medium and fused into connection therewith and following the outline of the design produced by the fusing and carrying medium, whereby to form a covering for the medium which will be uniform throughout the extent of the design and through which the said medium will be refracted, giving to the article an ornamental appearance in plush effect.

In testimony whereof I have signed my name to this specification in the presence of two subscribing witnesses.

ALBAN L. ROCK.

Witnesses:
GENJI KURIBARA,
MASATARO O. KASAVA.